(12) United States Patent
Bechtold et al.

(10) Patent No.: US 7,684,951 B2
(45) Date of Patent: Mar. 23, 2010

(54) METHOD AND DEVICE FOR DETECTING A PULSE-TYPE MECHANICAL EFFECT ON A SYSTEM PART

(75) Inventors: Bela Bechtold, Möhrendorf (DE); Peter Jax, Erlangen (DE); Vojtech Ocelik, Erlangen (DE); Jan Zach, Erlangen (DE)

(73) Assignee: Areva NP GmbH, Erlangen (DE)

(*) Notice: Subject to any disclaimer, the term of this patent is extended or adjusted under 35 U.S.C. 154(b) by 70 days.

(21) Appl. No.: 12/185,307

(22) Filed: Aug. 4, 2008

(65) Prior Publication Data

US 2009/0048791 A1 Feb. 19, 2009

Related U.S. Application Data

(63) Continuation of application No. PCT/EP2007/000135, filed on Jan. 10, 2007.

(30) Foreign Application Priority Data

Feb. 3, 2006 (DE) .................. 10 2006 004 947

(51) Int. Cl.
*G01L 1/00* (2006.01)
(52) U.S. Cl. .................................. 702/127
(58) Field of Classification Search .............. 702/127
See application file for complete search history.

(56) References Cited

U.S. PATENT DOCUMENTS

| | | | |
|---|---|---|---|
| 4,888,948 A | 12/1989 | Fisher et al. | |
| 5,479,826 A | 1/1996 | Twerdochlib et al. | |
| 6,208,944 B1 | 3/2001 | Franke et al. | |
| 6,494,046 B1 | 12/2002 | Hayess | |
| 6,499,350 B1 | 12/2002 | Board et al. | |
| 6,907,368 B2 | 6/2005 | Bechtold et al. | |
| 2001/0023582 A1 | 9/2001 | Nagel | |

FOREIGN PATENT DOCUMENTS

| | | |
|---|---|---|
| DE | 224 934 A1 | 7/1985 |
| DE | 195 45 008 C2 | 6/1997 |
| DE | 197 27 114 C2 | 2/1999 |
| DE | 198 43 615 C2 | 4/2000 |
| DE | 198 57 552 A1 | 6/2000 |
| EP | 0 765 466 B1 | 4/1997 |
| WO | 01/75272 A2 | 10/2001 |
| WO | 03/071243 A1 | 8/2003 |

OTHER PUBLICATIONS

International Search Report, dated Jan. 25, 2008.

*Primary Examiner*—Tung S Lau
(74) *Attorney, Agent, or Firm*—Laurence A. Greenberg; Werner H. Stemer; Ralph E. Locher

(57) ABSTRACT

A method and a device for detecting a pulse-type mechanical effect at a system component, include continuously recording an operating noise in the system component with a sensor disposed at the system component and converting the operating noise with the sensor into a measured signal subjected to a mathematical transformation. A sliding mean is calculated by determining quantiles from determined transformations and an evaluation function, which displays an application of the pulse-type mechanical effect on the system component, is derived from the sliding mean.

13 Claims, 4 Drawing Sheets

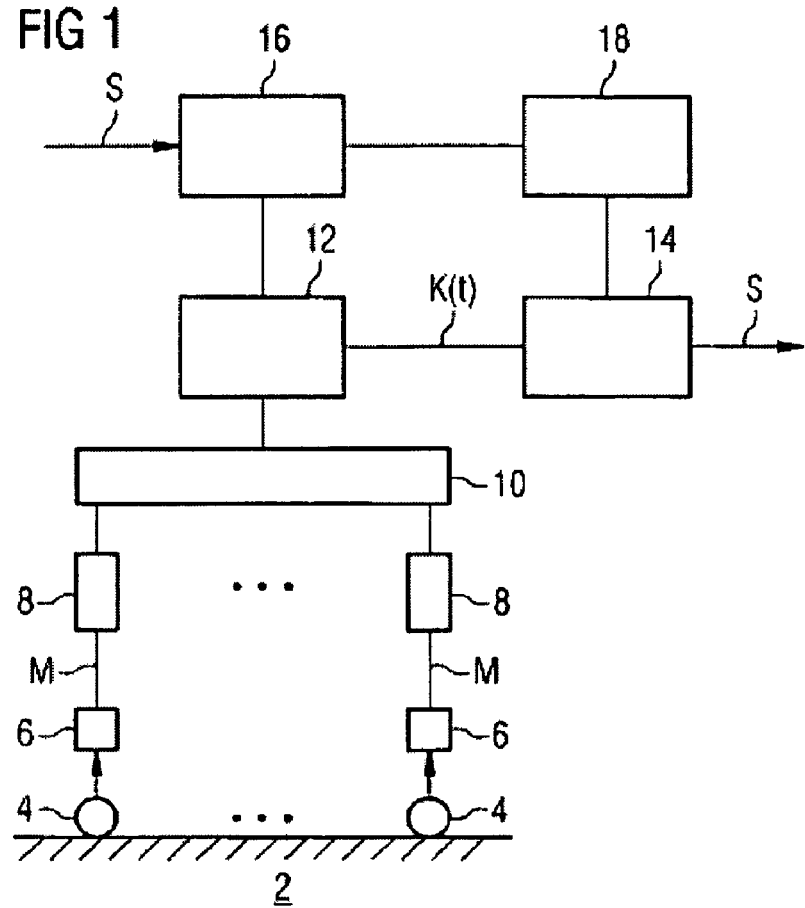
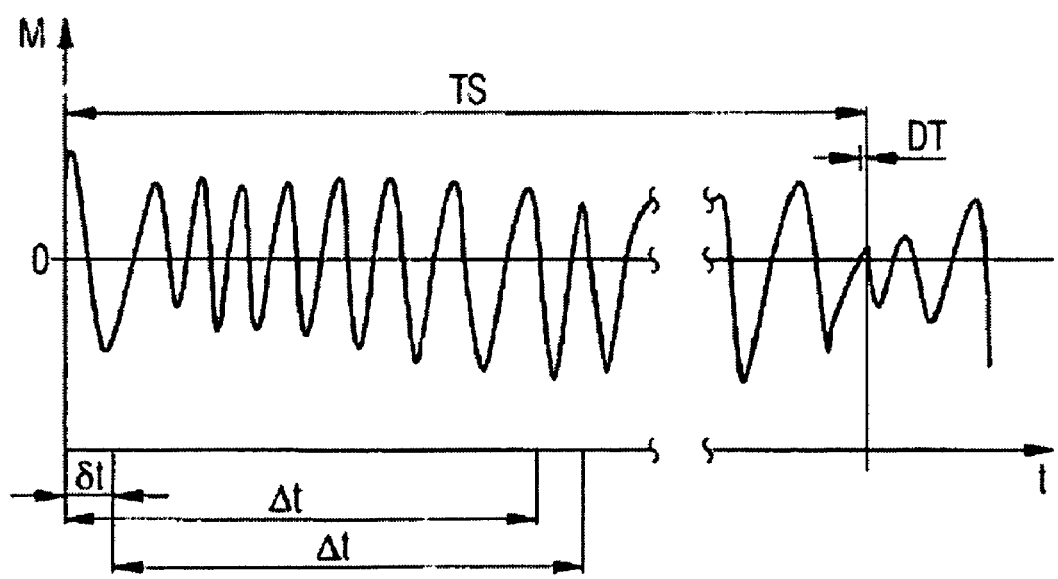

METHOD AND DEVICE FOR DETECTING A PULSE-TYPE MECHANICAL EFFECT ON A SYSTEM PART

CROSS-REFERENCE TO RELATED APPLICATIONS

This is a continuation, under 35 U.S.C. §120, of copending International Application No. PCT/EP2007/000135, filed Jan. 10, 2007, which designated the United States; this application also claims the priority, under 35 U.S.C. §119, of German Patent Application DE 10 2006 004 947.0, filed Feb. 3, 2006; the prior applications are herewith incorporated by reference in their entirety.

BACKGROUND OF THE INVENTION

Field of the Invention

The invention relates to a method and a device for detecting a pulse-type mechanical effect on a system part.

There is a need in a multiplicity of applications to continuously monitor the proper operation of a system part, for example a pipeline or a container in chemical process engineering or a fluid-flow machine, in order to detect disturbances in good time and to avoid serious consequential damage. A multiplicity of methods for such monitoring are known in the prior art.

European Patent EP 0 765 466 B1, corresponding to U.S. Pat. No. 5,479,826, proposes, for example, to undertake the monitoring of the vibrations of turbine blades with the aid of microwaves that are directed onto the turbine blades. Conclusions may be drawn on the turbine's state of vibration from the modulation of the microwaves reflected at the turbine blades.

In a method known from German Patent DE 198 57 552 A1, corresponding to U.S. Pat. No. 6,494,046, a rupture of a shaft of a turbine is detected by measuring rotational frequencies at ends of the shaft.

It is proposed in German Patent DE 198 43 615 C2 to undertake a diagnosis of a state of a combustion drive with the aid of an analysis of a frequency spectrum of measurement signals that are picked up with the aid of a sound pickup disposed in an air inlet region or exhaust gas region.

In German Patent DE 197 27 114 C2, corresponding to U.S. Pat. No. 6,208,944, a machine is monitored by detecting signals of structure-borne sound striking it, instead of air noise. In that known method, as well, there is an analysis of the respectively determined frequency spectra of the measurement signals detected by the structure-borne sound pickup.

In the case of a method disclosed in German Patent DE 195 45 008 C2, as well, the frequency spectrum of the measurement signal detected by a monitoring sensor, for example an acceleration pickup, is analyzed during the operation of the machine and compared with a reference frequency spectrum.

In order to be able to ascertain an intrusion of foreign parts into a gas turbine, in U.S. Pat. No. 4,888,948 a sensor is disposed at the inlet of the turbine, with the aid of which an electric charge induced by the foreign bodies is detected.

In a method disclosed in East German Patent Application DD 224 934 A1 for determining a change in state of a machine having rotating parts, measured values of a signal describing the operating state are detected continuously and compared with adaptive threshold values. Quantile values of the probability distribution of the measured values are determined recursively and adaptively in order to determine those threshold values. Parameters for the state of the machine are determined from the number and level of the instances of overshooting of the threshold values.

A particular problem is represented by loose parts that are entrained by a flow and strike a system part and which cause only a pulse-type, short term effect that is correspondingly problematic to demonstrate reliably.

Problems of that kind can occur, for example, in the case of gas turbines having combustion chambers which are lined with ceramic tiles for protection against overheating. Those ceramic tiles are subjected to high dynamic loads by alternating pressure fluctuations occurring in the combustion chamber. It can happen in that case that portions of the tiles on respective holders break away, are entrained by the flow of exhaust gas and strike the first guide-blade row of the gas turbine. That can lead to damage to the coating of the guide blades, and to destruction of the moving blades disposed therebehind. Moreover, there is the risk of a tile already damaged by the breaking away of portions becoming completely detached from the holders and possibly causing correspondingly massive damage to the gas turbine. In that case, the occurrence of small loose parts or an individual tile indicates an impending total breaking away of a tile or a number of tiles, and therefore switching off the gas turbine in good time and exchanging the damaged tiles prevent more extensive damage.

It is known in principle from International Publication No. WO 01/75272 A2, corresponding to U.S. Pat. No. 6,499,350, for the purpose of monitoring such impacts on a system part, to make use of suitable sensors to detect the impact through the use of structure-borne sound produced thereby. However, particularly in the case of gas turbines, the problem arises in that case that the normal level of operating noise is so high that even the signal component generated by the impact of a whole tile on the guide blade of the gas turbine is smaller than the background generated by the normal operating noises and therefore, in particular, the occurrence of relatively small portions cannot be detected by simply monitoring the amplitudes of the signals of structure-borne sound. It is therefore proposed in that publication, for the purpose of improving the signal-to-noise ratio, to subject the measurement signal picked up by a measuring sensor to bandpass or high-pass filtering in order to eliminate the signals of structure-borne sound produced in normal operation of the turbine in that way. Those measures are not, however, sufficient for reliably identifying a pulse-type event in the case of high background noises that vary temporally.

A method for detecting a pulse-type mechanical effect on a system part in the case of which the detected structure-borne sound signal is subjected to a windowed Fourier transformation, is known from International Publication No. WO 03/071243, corresponding to U.S. Pat. No. 6,907,368. Algorithms which are explained in more detail therein are used to derive an evaluation function K that indicates the occurrence of a pulse-type mechanical effect on the system part from a multiplicity of Fourier spectra determined in that way. The algorithm, specified in that publication, for deriving the evaluation function K, enables the precise detection of a signal component that is superposed on the noisy measurement signal and is to be ascribed to a pulse-type effect.

The important step in that proposed evaluation algorithm is that for each time window and each of the prescribed frequencies, the deviation of the magnitude A of the Fourier transform from a mean magnitude $\overline{A}$ is determined. In that case, a decisive significance attaches to the formation of the mean magnitude $\overline{A}$, since there can be random changes in state in system parts, particularly in the case of a turbine, in which the system part changes from one operating state into another, and the operating or background noise can rise very quickly to a significantly higher level. The start of a so-called hum is such a change in state, in the case of a turbine, for example. That is caused by the configuration of the flames in an annular space, which can have the result that the entire combustion chamber is excited to sympathetic vibrations, with the vibration modes in the circumferential direction being preferred, in particular. Those resonance phenomena can in part break off abruptly and likewise start up again abruptly. If a sliding mean magnitude that is formed by a simple averaging as an arithmetic mean from a number of prior magnitudes is used as a basis for the method disclosed in International Publication No. WO 03/071243, corresponding to U.S. Pat. No. 6,907, 368, with the content of International Publication No. WO 03/071243, corresponding to U.S. Pat. No. 6,907,368, being expressly incorporated by reference in the instant patent application, it has emerged that those noise fluctuations can lead to erroneous triggering. In order to avoid instances of such erroneous triggering, monitoring for pulse-type mechanical effects was therefore suppressed in practice during the humming of the turbine, which is detected by analyzing the signal characteristic.

In other system parts, as well, for example in a reactor pressure vessel of a nuclear power plant, operationally induced short-term operating noises are superposed on the continuous basic noises (fluid flow, pump noise), which are caused, for example, by permissible changes in the operating conditions and intentional interventions in the operating sequence (actuation of valves, movement of control rods).

SUMMARY OF THE INVENTION

It is accordingly an object of the invention to provide a method and a device for detecting a pulse-type mechanical effect on a system part, which overcome the hereinaforementioned disadvantages of the heretofore-known methods and devices of this general type and which are further improved in comparison with the method disclosed in International Publication No. WO 03/071243, corresponding to U.S. Pat. No. 6,907,368.

With the foregoing and other objects in view there is provided, in accordance with the invention, a method for detecting a pulse-type mechanical effect on a system part, in which an operating noise present in the system part is detected continuously by a sensor disposed on the system part, and is converted by the sensor into a measurement signal that is processed with the aid of the following method steps:

a) a magnitude ($A(f_i,t_j)$) of the transform of the measurement signal (M) is determined with the aid of prescribed parameters of a mathematical transformation rule in time steps of temporally sequential time windows;

b) a deviation of the magnitude ($A(f_i,t_j)$) from a mean magnitude ($\overline{A}(f_i,t)$) is determined for each time step ($\delta t$) and each of the prescribed parameters ($f_i$);

c) an evaluation function ($K(t)$) is derived for each time step ($\delta t$) from the deviations determined for each of the prescribed parameters ($f_i$);

d) the evaluation function ($K(t)$) is compared with a threshold value ($K_0$), and an overshooting of the threshold value ($K_0$) is used as an index for the presence of a pulse-type signal component indicating the mechanical effect; and e) the mean magnitude ($\overline{A}(f_i,t_j)$) is determined in a sliding fashion as a function of time (t) from a data record ($A(f_i,t)$) having M magnitudes ($A(f_i,t_m)$) with the aid of a relationship:

$$\overline{A}(f_i,t)=(Q_\alpha(f_i,t)+Q_{1-\alpha}(f_i,t))/2$$

with $Q_\alpha$ and $Q_{1-\alpha}$ being respectively $\alpha$ and $(1-\alpha)$ quantiles of the magnitudes ($A(f_i,t_m)$) respectively determined in a time segment (T), with $t_m=t+m\delta t$ and with m being a whole number.

The invention is based in this case on the finding that a simple numerical averaging of the magnitude A can have the consequence that a fast transition of the operating state into a state having a higher noise level is erroneously interpreted as a burst signal, that is to say a signal resulting from a pulse-type effect on the system part. Such a signal is illustrated in the diagram of FIG. 2. In this diagram, the measurement signal M picked up at a turbine by a structure-borne sound pickup is plotted against time t. It is to be seen in the figure that a humming that lasts respectively approximately 2 s sets in abruptly at the instants t=4 s and t=8 s.

The evaluation function K(t) derived from the measurement signal M in accordance with FIG. 2 on the basis of International Publication No. WO 03/071243, corresponding to U.S. Pat. No. 6,907,368, is illustrated, likewise as a function of time, in a diagram in FIG. 3. It is to be gathered from this figure that the evaluation function K(t) rises significantly at least during the time period of the humming of the turbine between t=4 s and t=6 s. That rise would then be erroneously interpreted as a burst signal for the occurrence of a large system part. In that case, the calculation of the evaluation function K(t) was based on an improved iterative calculating method in which the mean magnitude $\overline{A}$ and a mean quadratic deviation (variance) are determined for each frequency fi in a sliding fashion with the aid of the relationships:

$$\overline{A}(f_i,t+\delta t)=k\overline{A}(f_i,t)+(1-k)A(f_i,t+\delta t) \text{ and}$$

$$varA(f_i,t+\delta t)=kvarA(f_i,t)+(1-k)(A(f_i,t+\delta t)-\overline{A}(f_i,t))^2,$$
with $\delta t$ being the time step in which the magnitude A is respectively determined for a time window $\Delta t$. By selecting the parameter k, it is now determined to what extent a magnitude $A(f_i,t+\delta t)$ being newly added thereto influences the newly calculated mean magnitude $\overline{A}(f_i,t+\delta t)$. This approach corresponds to an exponentially weighted averaging, with k determining the adaptation rate. In the event of a sudden change in the magnitude $A(f_i,t)$ from a constant initial value to a likewise constant new value, there would then be an approximately exponential adaptation of the new mean magnitude $\overline{A}$ to the new, currently present magnitude A with a time constant $\tau=\delta t/(1-k)$. For k=0.999 and $\delta t \approx 3.2$ ms, there is a time constant $\tau$ of 3.2 s.

As is to be gathered from FIG. 3, even an evaluation algorithm improved in this way is not capable of adapting optimally to fast changes in the operating noise, that is to say of determining with sufficient accuracy the respectively valid mean magnitude $\overline{A}(f_i,t)$, and the standard deviation $A(f_i,t)$ thereof, of the operating noise in the event of fast changes. Certainly, it is possible in principle to adapt the mean magnitude $\overline{A}(f_i,t)$ more quickly to the changed operating situation by reducing the time constant $\tau$, that is to say by reducing the parameter k. However, that has the disadvantage that a superposed burst signal can no longer be recorded with sufficient sensitivity. In order to be able to distinguish burst signals such as are caused by the striking of loose parts from those superposed background noises of the machine, it is necessary to determine a mean on which no burst signal is superposed, or for which a possibly superposed burst signal in any event has a negligible influence on the mean magnitude $\overline{A}(f_i,t)$ due to a very large time constant.

With the objects of the invention in view, there is concomitantly provided a device for detecting a pulse-type mechanical effect on a system part. The device comprises at least one sensor disposed at the system part for continuously detecting and measuring an operating noise present in the system part and outputting measurement signals (M). An A/D converter is connected downstream of the sensor for digitizing the measurement signals (M) output by the sensor. An arithmetic unit for receiving digitized measurement signals from the A/D converter is programmed to:

a) determine a magnitude ($A(f_i,t_j)$) of a transform of the measurement signals (M) with prescribed parameters ($f_i$) of a mathematical transformation rule in time windows ($\Delta t$) being temporally sequential in time steps ($\delta t$);

b) determine a deviation of the magnitude ($A(f_i,t_j)$) from a mean magnitude ($\overline{A}(f_i,t)$) for each time step ($\delta t$) and each of the prescribed parameters ($f_i$);

c) derive an evaluation function (K(t)) for each time step ($\delta t$) from the deviations determined for each of the prescribed parameters ($f_i$);

d) compare the evaluation function (K(t)) with a threshold value ($K_0$), and use an overshooting of the threshold value ($K_0$) as an index for a presence of a pulse-type signal component indicating the mechanical effect; and e) determine the mean magnitude ($\overline{A}(f_i,t_j)$) in a sliding fashion as a function of time t from a data record (A(t)) having M magnitudes $A(t_m)$ with the aid of a relationship:

$$\overline{A}(f_i,t)=(Q_\alpha(f_i,t)+Q_{1-\alpha}(f_i,t))/2$$

with $Q_\alpha$ and $Q_{1-\alpha}$ being respective $\alpha$ and $(1-\alpha)$ quantiles of the magnitudes $A(f_i,t_m)$ respectively determined in a time segment (T), with $t_m=t+m\delta t$, and with m being a whole number.

Other features which are considered as characteristic for the invention are set forth in the appended claims.

Although the invention is illustrated and described herein as embodied in a method and a device for detecting a pulse-type mechanical effect on a system part, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF SEVERAL VIEWS OF THE DRAWINGS

FIG. 1 is a block diagram of an exemplary embodiment of a device according to the invention;

FIG. 4 is a simplified diagram in which the measurement signal M is plotted against time t with higher temporal resolution;

DETAILED DESCRIPTION OF THE INVENTION

Figure 2:
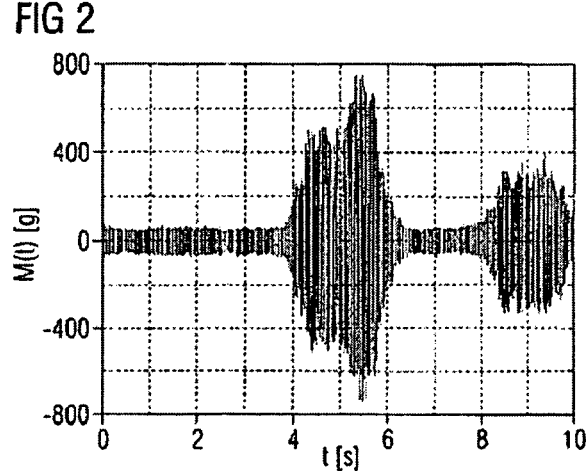
FIG. 2 is a diagram in which an operating noise (measurement signal M) of a turbine that is detected by a measuring pickup is plotted against time t.
Figure 3:
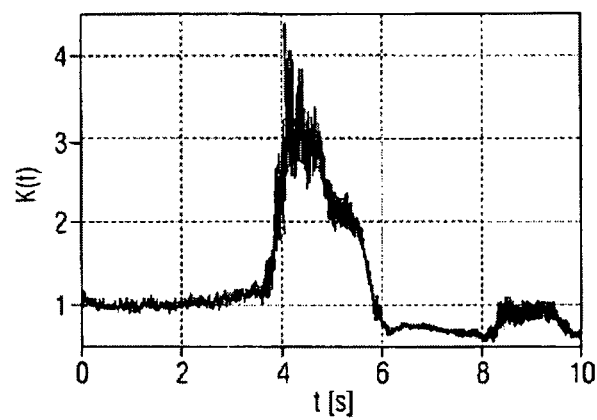
FIG. 3 is a diagram in which an evaluation function K derived from the measurement signal M of FIG. 2 in accordance with an evaluation algorithm represented in International Publication No. WO 03/071243, corresponding to U.S. Pat. No. 6,907,368, is plotted against time.

Referring now to the figures of the drawings in detail and first, particularly, to FIG. 1 thereof, there is seen a plurality of measuring pickups or sensors 4 disposed on a system part 2, for example a gas turbine. The measuring pickups or sensors 4, in particular piezoelectric acceleration pickups, continuously detect, in a number of measuring channels, operating noise present in the system part 2 and propagating in the form of structure-borne sound. The sensors 4 respectively convert the structure-borne sound signals into an electric measurement signal that is amplified in a pre-amplifier 6 and is relayed to an analog/digital converter 8 that is connected to a digital memory 10. An amplified measurement signal M which is respectively present is thus digitized, buffered and relayed for further processing to an arithmetic unit 12 in which an evaluation algorithm according to the invention is implemented.

The arithmetic unit 12 includes, for each measuring channel, a processor for a fast calculation of a transform of the data relayed by the analog/digital converter 8, as well as a ring memory for storing a number L of the transforms determined by the transformation. This transformation can, for example, be a fast windowed Fourier transformation FFT. Any mathematical operation with which it is possible to represent this mathematical function with the aid of a complete set of orthogonal base functions is to be understood as a transformation of that function (a measurement signal M(t)) in the meaning of the present invention. As is the case with the Fourier transformation, these orthogonal base functions can be formed by an exponential function $e^{-i\omega t}$. However, it is also possible in principle to use other periodic functions as an orthogonal base system. These transformations are used to calculate discrete transforms with the aid of a predetermined set of discrete parameters. In the case of Fourier transformation, these are permanently prescribed frequencies $f_i=\omega_i/2\pi$ that are selected in accordance with the respective system part, as is explained in more detail for a turbine, for example, in International Publication No. WO 03/071243, corresponding to U.S. Pat. No. 6,907,368.

For each measuring channel, an algorithm implemented in the arithmetic unit 12 and explained in more detail below employs the discrete transforms determined in the arithmetic unit 12 to determine an evaluation function K(t) dependent on time t that is compared in a comparing device 14 with a prescribed threshold value $K_0$. An overshooting of the threshold value $K_0$ (alarm threshold) serves as an index for the presence of a pulse-type signal component caused by a transient mechanical effect, and generates a corresponding trigger signal S. The trigger signal S is fed to a transient recorder 16 in which the measured data (measurement signals $M_s$) for a time range of 10 s, for example, is recorded and relayed to an evaluation computer 18 in order to permit the latter to be used to carry out a subsequent analysis.

FIG. 2 shows the measurement signal M respectively detected by a sensor 4 at a turbine for a time period of approximately 10 s. It is clearly to be seen that the turbine begins to hum abruptly at instants t=4 s and t=8 s.

FIG. 4 uses a diagrammatic sketch to explain a first step of a mode of procedure implemented in the arithmetic unit 12 (FIG. 1). The measurement signal M, which is digitized with a high clock rate (typically 80-100 kHz, having an associated time interval DT of approximately 0.01-0.0125 ms, drawn enlarged in the figure and illustrated in analog fashion in the figure for reasons of clarity), is respectively stored for a time range TS (typically approximately 10 s) and updated in accordance with the clock rate. In a time window $\Delta t$ within this time range TS, the digitized measurement signal M is subjected to a fast discrete Fourier transformation. Subsequently, the time window $\Delta t$ is updated and displaced by a time step $\delta t$, and a Fourier transformation is carried out anew in an overlapping time window $\Delta t$ of the same length. In the exemplary embodiment, $\Delta t=25.6$ ms and $\delta t=3.2$ ms. In this way, time-dependent magnitudes $A(f_i,t)$ are determined for each time window $\Delta t$ and for a finite number of discrete frequencies $f_i$.

Figure 5:
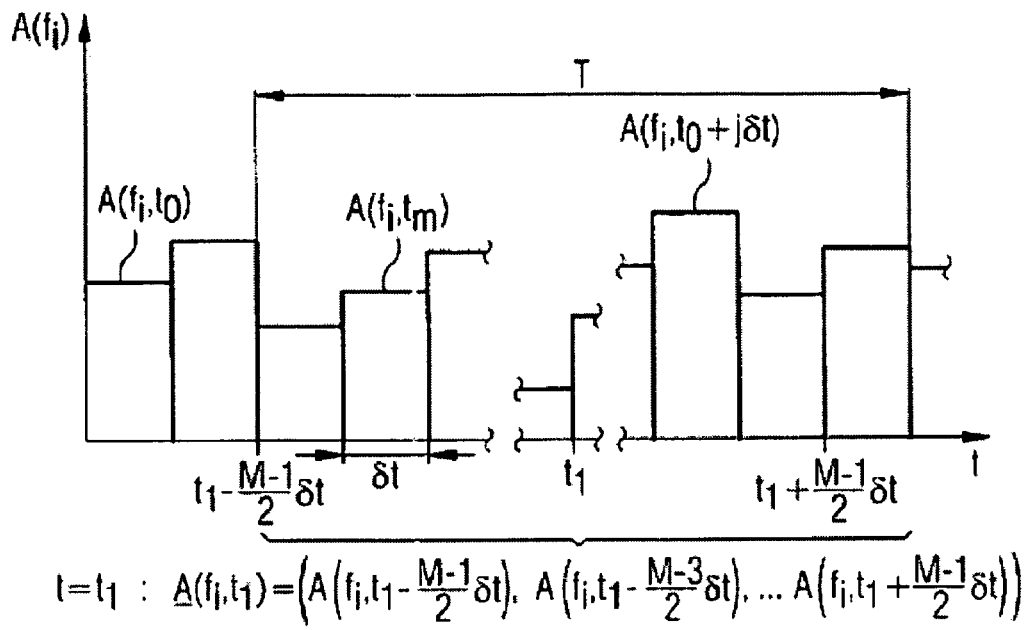
FIG. 5 is a diagram in which a magnitude A of a frequency spectrum determined from the measurement signal M by fast Fourier transformation is plotted against time t for a prescribed frequency $f_i$.

FIG. 5 illustrates the time profile of a magnitude A for a prescribed frequency $f_i$. It may be gathered from this figure that the magnitude A varies with time for this prescribed frequency $f_i$. The time interval plotted in the figure is the time step $\delta t$ in which the fast Fourier transformation is updated. In accordance with the invention, the associated value of the magnitude $A(f_i,t_j)$, where $t_j=t_0+j\delta t$, with j being a natural number, is determined for a multiplicity N of prescribed frequencies $f_i$ or frequency ranges and in temporally sequential time steps $\delta t$ for temporally overlapping time windows $\Delta t$.

Figure 6:
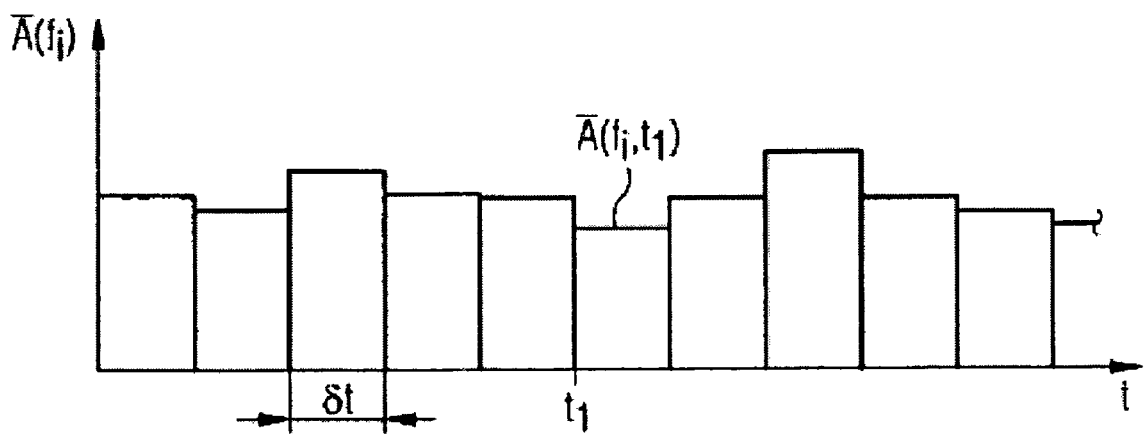
FIG. 6 is a diagram in which a sliding time mean $\overline{A}$ of the magnitudes A of the spectrum is likewise plotted against time t for a prescribed frequency $f_i$.

A mean magnitude $\overline{A}(f_i,t)$ is now formed from the values of the magnitude $A(f_i,t)$. This mean magnitude $\overline{A}(f_i,t)$ is a temporally sliding mean which is determined in a sliding fashion in time steps $\delta t$ as a function of the time t from a data record $A(f_i,t)$, assembled from M magnitudes $A(f_i,t_m)$ of a time segment T, with the aid of a relationship:

$$\overline{A}(f_i,t)=(Q_\alpha(f_i,t)+Q_{1-\alpha}(f_i,t))/2,$$

wherein $Q_\alpha$ and $Q_{1-\alpha}$ are $\alpha$ and $(1-\alpha)$ quantiles of the magnitudes $A(f_i,t_m)$ relatively determined in a time segment T, where $t_m=t+m\delta t$ and m is a whole number. To this end, the magnitudes $A(f_i,t_m)$ associated with this time segment T, disposed by way of example symmetrically in relation to the instant t (with it holding in this case that $$-\frac{M-1}{2}\leq m\leq\frac{M-1}{2}$$

and M is odd), and respectively forming the data record $A(f_i,t)$ assigned to the instant t, are sorted in a sequence by value of the magnitude. The $\alpha$ or $(1-\alpha)$ quantile is then that value of the magnitude which is located at the position $\alpha M$ or $(1-\alpha)M$ of the sequence. In practice, values are set between $0.7\leq\alpha\leq0.8$, preferably $\alpha=0.75$ for $\alpha$. A mean magnitude $\overline{A}(f_i,t)$ obtained with the aid of this calculating method is illustrated in FIG. 6.

The $\alpha$ and $(1-\alpha)$ quantiles, $Q_\alpha$ and $Q_{1-\alpha}$, respectively, are now used to calculate a mean deviation $s(f_i,t)$ of the magnitudes $A(f_i,t_m)$ from the mean magnitude $\overline{A}(f_i,t)$, by using a relationship:

$$s(f_i,t)=\sqrt{\frac{Q_\alpha(f_i,t)-Q_{1-\alpha}(f_i,t)}{2q_{1-\alpha}}},$$

with $q_{1-\alpha}$ being the $(1-\alpha)$ quantile of the normalized Gaussian distribution or normal distribution.

This calculating method (quantile method) can therefore be used to calculate the mean and deviation of a data record without taking into account the values that are located outside the ranges defined by $\alpha$ and $(1-\alpha)$. This means that substantially higher magnitudes such as can occur in an additionally amplified fashion from a superposed burst signal are not taken into account, and thus also cannot corrupt the result. This method can be used in conjunction with the same quality of the result of calculation to select a substantially shorter time segment, for example a data record $A(f_i,t)$ including M=100 values of the magnitude $A(f_i,t_j)$ and having a length of T=320 ms for the time segment for a time step $\delta t=3.2$ ms. Consequently, the mean magnitude $\overline{A}(f_i,t)$ is adapted to rapid changes in the operating background so that they are unable to lead to corruption of the normalized spectra or to appear as erroneous displays in the monitoring. It is possible in the case of such a mode of procedure for the striking of loose parts to be detected even during the humming of a gas turbine, that is to say when sympathetic vibrations in the combustion chamber give rise to substantially higher background noises very abruptly, for example with a time constant of approximately 0.5 s in association with an amplitude rise by a factor of 5 and more.

The existing calculated mean magnitude $\overline{A}(f_i,t)$ and the mean deviation $s(f_i,t)$ can now be used in a further computing step to determine, on the basis of the quantile method, an improved mean magnitude $\overline{A}_{opt}(f_i,t)$ by eliminating from the respectively present data record $A(f_i,t)$ those magnitudes $A(f_i,t_m)$ that are significantly greater than the previously calculated mean magnitude $\overline{A}(f_i,t)$. In practice, it has proved to be advantageous in this case when calculating the mean to eliminate those magnitudes $A(f_i,t_m)$ that are greater than $\overline{A}(f_i,t)+3s(f_i,t)$. With the complete data record $A(f_i,t)$, a renewed calculation of mean is then carried out with the aid of a $\delta$ or $(1-\delta)$ quantile, in which case $$\delta=\alpha(M-M_E)/M$$

holds, and $M_E$ is the number of the magnitudes $A(f_i,t_m)$ that are greater than $\overline{A}(f_i,t)+3s(f_i,t)$. As an alternative thereto, it is also possible and mathematically identical to determine the a and $(1-\alpha)$ quantile anew with the aid of a data record reduced by these magnitudes $(A(f_i,t_m))$. With the aid of these $\delta$ and $(1-\delta)$ quantiles, or of the $\alpha$ and $(1-\alpha)$ quantiles obtained with the reduced data record, an improved mean $\overline{A}_{opt}(f_i,t)$ or an improved mean deviation $s_{opt}(f_i,t)$ is now calculated in accordance with the above-mentioned formula.

With the aid of the mean magnitudes $\overline{A}(f_i,t)$ or $\overline{A}_{opt}(f_i,t)$ and of the mean deviation $s(f_i,t)$ or $s_{opt}(f_i,t)$, a normalized deviation $D(f_i,t)$ of the magnitude A from the mean magnitude $\overline{A}$ is now calculated for each frequency in accordance with the following equation:

$$D(f_i,t_m)=(A(f_i,t_m)-\overline{A}(f_i,t))/s(f_i,t) \text{ or}$$

$$D(f_i,t_m)=(A(f_i,t_m)-\overline{A}_{opt}(f_i,t))/s_{opt}(f_i,t).$$

The magnitudes $A(f_i,t_m)$ of M spectra are evaluated in order to determine the mean magnitude $\overline{A}(f_i,t)$ valid at the instant t and the mean deviation $s(f_i,t)$ valid at this instant t. In other words: both the mean magnitude $\overline{A}(f_i,t)$ or $\overline{A}_{opt}(f_i,t)$ and the mean deviation $s(f_i,t)$ or $s_{opt}(f_i,t)$ are constantly updated with the aid of M transformations. This updating is performed in time steps $\delta t$. The data record $A(t+\delta t)$ forming the basis of the calculation of the new mean magnitude $\overline{A}(f_i,t+\delta t)$ or $\overline{A}_{opt}(f_i,t+\delta t)$ and of the new mean deviation $s(f_i,t+\delta t)$ or $s_{opt}(f_i,t+\delta t)$ is formed in this case by deleting the first (oldest) magnitude and adding the newest magnitude. In the case of a time segment T disposed symmetrically relative to the instant t, these are the magnitudes:

$$A\left(f_i, t - \frac{M-1}{2}\delta t\right)$$

and $$A\left(f_i, t + \frac{M-1}{2}\delta t\right).$$

In an advantageous refinement, the normalized deviation $D(t, f_i)$ is additionally averaged in a frequency range $f_{i-L}$, $f_{i-L+1}$, ... $f_{i+L}$ surrounding the frequency $f_i$ and formed of $2L+1$ frequencies, and a mean normalized deviation $\overline{D}(t, f_i)$ is determined by an equation:

$$\overline{D}(f_i, t) = \frac{1}{1-2L}\sum_{k=-L}^{k=+L} D(f_{i+k}, t).$$

This additional computing step leads to a reduction in the level and breadth of fluctuation of normalized deviation in the ranges in which only background signals are present. The useful signal components are not markedly varied by the averaging in the frequency range, since they always occur in a fashion concentrated about neighboring frequency lines. This measure results once more in an improvement to the signal/background ratio by a further 10 to 15 dB.

A further improvement in the signal/background ratio is achieved when a threshold value $D_0$ is additionally introduced, and a normalized deviation $\overline{D}_s(f_i,t)$ is determined with the aid of a relationship $\overline{D}_s = D_0$ for $\overline{D} < D_0$ and $\overline{D}_s = \overline{D}$ for $\overline{D} \geq D_0$.

The normalized deviations $D(f_i,t)$, $\overline{D}(f_i,t)$ or $\overline{D}_s(f_i,t)$ determined in this way are squared and summed through all of the discrete frequencies $f_i$:

$$S(t) = \sum_{i=1}^{N} D(f_i, t)^2 / N \quad (a)$$

$$S(t) = \sum_{i=1}^{N} \overline{D}(f_i, t)^2 / N \quad (b)$$

or $$S(t) = \sum_{i=1}^{N} \overline{D}_s(f_i, t)^2 / N. \quad (c)$$

An evaluation function $K(t)$ is now derived from this sum $S(t)$ by extracting the root:

$$K(t) = \sqrt{S(t)} \quad (1).$$

The latter serves as an indicator for the occurrence of an impact. As an alternative to this, it is also possible for the evaluation function to be formed from the difference between the root of the sum $S(t)$ and a sliding time mean of this root $$\tilde{K}(t) = K(t) - \overline{K}(t) \quad (2),$$

and for it to serve as a characteristic for the occurrence of an impact. If $K(t)$ or $\tilde{K}(t)$ overshoots a threshold value $K_0$ (alarm threshold), which is between 1.5 and 2 for gas turbines, this constitutes an indication for the impact of a loose part.

Figure 7:
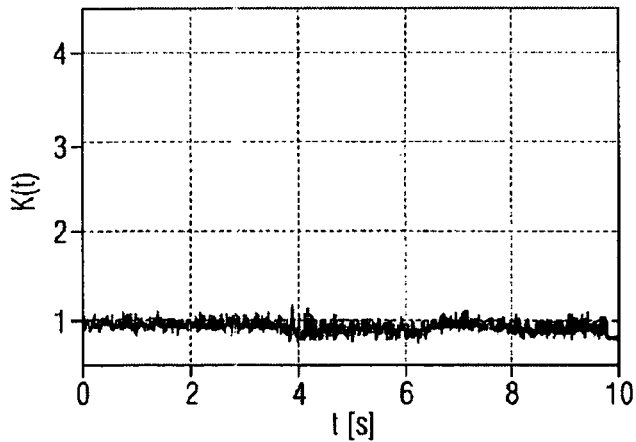
FIG. 7 is a diagram in which an evaluation function K derived from the measurement signal of FIG. 2 with the aid of a method in accordance with the invention is plotted against time t.

The evaluation function $K(t)$ obtained in this way and with the aid of the mean normalized deviation $\overline{D}_s$ from the measurement signal M of FIG. 2 is illustrated in FIG. 7. It is now clearly to be seen that the humming of the turbine does not influence the evaluation function $K(t)$.

Figure 8:
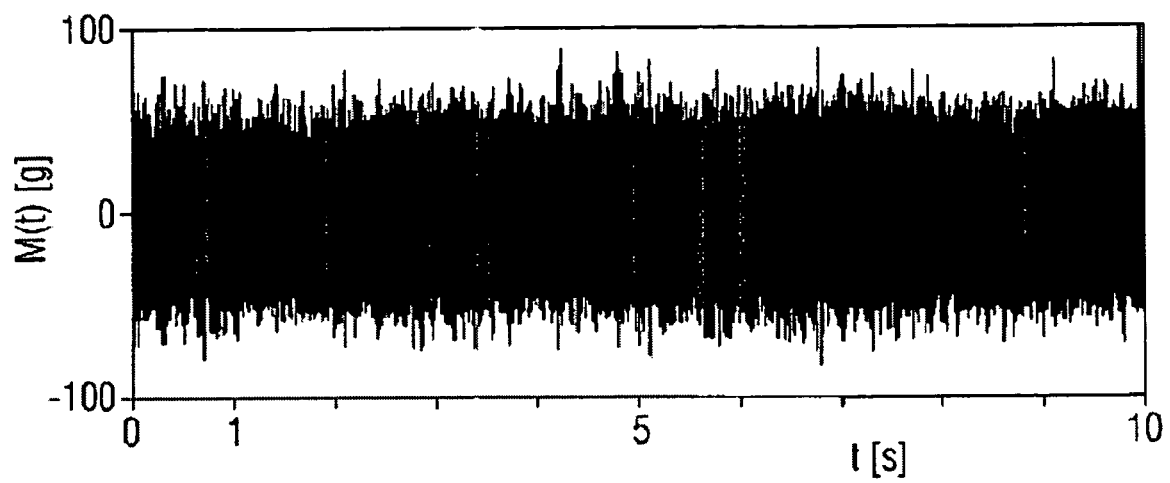
FIG. 8 is a diagram in which the measurement signal M picked up at a turbine and on which there is superposed a burst caused by an impact is plotted against time t.

Nevertheless, it remains possible with the aid of the method according to the invention to reliably detect the striking of a loose system part. FIG. 8 shows a real measurement signal $M(t)$ obtained on a turbine and on which there is superposed at an instant $t \approx 3.9$ s a burst that is caused by an impact and cannot be identified directly in the measurement signal M.

Figure 9:
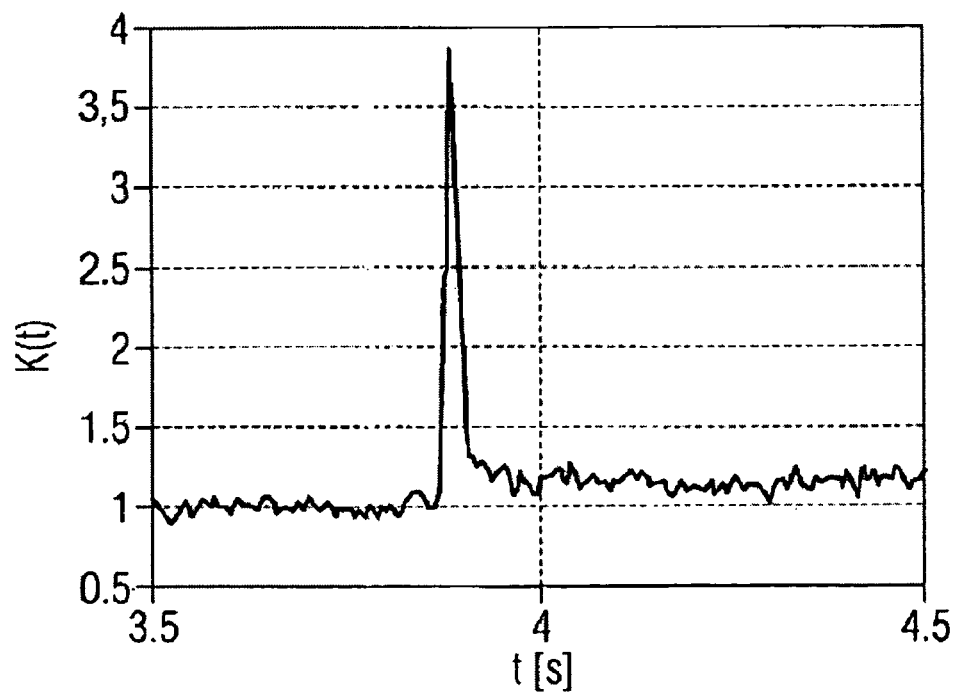
FIG. 9 is a diagram in which the evaluation function K determined from this measurement signal is likewise plotted against time.

FIG. 9 illustrates, with an enlarged time scale, the evaluation function K derived from the measurement signal of FIG. 8. It is to be seen from the figure that the event (the burst) taking place is rendered noticeable by a clear rise in the evaluation function K.

The invention claimed is:

1. In a method for detecting a pulse-type mechanical effect on a system part, which includes continuously detecting an operating noise present in the system part with a sensor disposed at the system part and converting the operating noise with the sensor into a measurement signal (M), the improvement comprising the following steps:

a) determining a magnitude $(A(f_i,t_j))$ of a transform of the measurement signal (M) with prescribed parameters $(f_i)$ of a mathematical transformation rule in time windows ($\Delta t$) being temporally sequential in time steps ($\delta t$);

b) determining a deviation of the magnitude $(A(f_i,t_j))$ from a mean magnitude $(\overline{A}(f_i,t))$ for each time step ($\delta t$) and each of the prescribed parameters $(f_i)$;

c) deriving an evaluation function $(K(t))$ for each time step ($\delta t$) from the deviations determined for each of the prescribed parameters $(f_i)$;

d) comparing the evaluation function $(K(t))$ with a threshold value $(K_0)$, and using an overshooting of the threshold value $(K_0)$ as an index for a presence of a pulse-type signal component indicating the mechanical effect; and e) determining a mean magnitude $(\overline{A}(f_i,t_j))$ in a sliding fashion as a function of time t from a data record $(A(f_i,t))$ having M magnitudes $A(f_i,t_m)$ with the aid of a relationship:

$$\overline{A}(f_i,t) = (Q_\alpha(f_i,t) + Q_{1-\alpha}(f_i,t))/2$$

with $Q_\alpha$ and $Q_{1-\alpha}$ being respective $\alpha$ and $(1-\alpha)$ quantiles of the magnitudes $A(f_i,tm)$ respectively determined in a time segment (T), with $t_m = t + m\delta t$, and with m being a whole number.

2. The method according to claim 1, wherein the time segment (T) is disposed symmetrically in relation to the time t.

3. The method according to claim 1, which further comprises calculating an improved mean magnitude $(\overline{A}_{opt}(f_i,t))$ from the mean magnitude $(\overline{A}(f_i,t))$, and eliminating from the data record magnitudes $(A(f_i,t))$ overshooting the mean magnitude $(\overline{A})$ by a prescribed difference value to determine the quantiles.

4. The method according to claim 1, which further comprises determining, for each of the prescribed parameters $(f_i)$, a mean deviation $(s(f_i,t))$ of the magnitudes $(A(f_i,t_j))$ from the mean magnitude $(\overline{A}(f_i,t))$ for a plurality of sequential time windows ($\Delta t$) with the aid of a relationship:

$$s(f_i, t) = \sqrt{\frac{Q_\alpha(f_i, t) - Q_{1-\alpha}(f_i, t)}{2q_{1-\alpha}}}$$

with $q_{1-\alpha}$ being the $(1-\alpha)$ quantile of a normalized normal distribution, and a normalized deviation of the magnitudes from the mean magnitude ($\overline{A}(f_i,t)$) being determined with the aid thereof and being used to calculate the evaluation function (K(t)).

5. The method according to claim 4, which further comprises calculating an improved mean magnitude ($\overline{A}_{opt}(f_i,t)$) from the mean magnitude ($\overline{A}(f_i,t)$), eliminating from the data record magnitudes (A($f_i$,t)) overshooting the mean magnitude ($\overline{A}$) by a prescribed difference value to determine the quantiles, and the prescribed difference value being a threefold multiple of the mean deviation (s).

6. The method according to claim 5, which further comprises for each time window ($\Delta t$), forming a sum of the squares of each normalized deviation over each of the prescribed parameters from which the evaluation function (K) is derived.

7. The method according to claim 1, wherein the mathematical transformation rule is a windowed Fourier transformation, and the parameters are frequencies ($f_i$) of a frequency spectrum of the measurement signal (M).

8. A device for detecting a pulse-type mechanical effect on a system part, the device comprising:
  at least one sensor disposed at the system part for continuously detecting and measuring an operating noise present in the system part and outputting measurement signals (M);
  an A/D converter connected downstream of said sensor for digitizing the measurement signals (M) output by said sensor; and
  an arithmetic unit for receiving digitized measurement signals from said A/D converter, said arithmetic unit programmed to:
  a) determine a magnitude (A($f_i$,$t_j$)) of a transform of the measurement signals (M) with prescribed parameters ($f_i$) of a mathematical transformation rule in time windows ($\Delta t$) being temporally sequential in time steps ($\delta t$);
  b) determine a deviation of the magnitude (A($f_i$,$t_j$)) from a mean magnitude ($\overline{A}(f_i,t)$) for each time step ($\delta t$) and each of the prescribed parameters ($f_i$);
  c) derive an evaluation function (K(t)) for each time step ($\delta t$) from the deviations determined for each of the prescribed parameters ($f_i$);
  d) compare the evaluation function (K(t)) with a threshold value ($K_0$), and use an overshooting of the threshold value ($K_0$) as an index for a presence of a pulse-type signal component indicating the mechanical effect; and
  e) determine the mean magnitude ($\overline{A}(f_i,t_j)$) in a sliding fashion as a function of time t from a data record (A(t)) having M magnitudes A($t_m$) with the aid of a relationship:

$$\overline{A}(f_i,t) = (Q_\alpha(f_i,t) + Q_{1-\alpha}(f_i,t))/2$$

with $Q_\alpha$ and $Q_{1-\alpha}$ being respective $\alpha$ and $(1-\alpha)$ quantiles of the magnitudes A($f_i$,$t_m$) respectively determined in a time segment (T), with $t_m = t + m\delta t$, and with m being a whole number.

9. The device according to claim 8, wherein the time segment (T) is disposed symmetrically in relation to the time (t).

10. The device according to claim 8, wherein said arithmetic unit implements an algorithm for calculating an improved mean magnitude ($\overline{A}_{opt}(f_i,t)$) from the mean magnitude ($\overline{A}(f_i,t)$), and magnitudes (A($f_i$,$t_m$)) overshooting the mean magnitude ($\overline{A}(f_i,t)$) by a prescribed difference value are eliminated from the data record (A(t)) to determine the quantiles.

11. The device according to claim 8, wherein said arithmetic unit determines, for each of the prescribed parameters ($f_i$), the mean deviation (s($f_i$,t)) of the magnitudes (A($f_i$,$t_j$)) from the mean magnitude ($\overline{A}(f_i,t)$) for a plurality of sequential time windows ($\Delta t$) with the aid of a relationship:

$$s(f_i, t) = \sqrt{\frac{Q_\alpha(f_i, t) - Q_{1-\alpha}(f_i, t)}{2q_{1-\alpha}}}$$

with $q_{1-\alpha}$ being the $(1-\alpha)$ quantile of a normalized normal distribution, and the normalized deviation of the magnitudes from the mean magnitude ($\overline{A}(f_i,t)$) being determined with the aid thereof and being used to calculate the evaluation function (K(t)).

12. The device according to claim 11, wherein said arithmetic unit implements an algorithm for calculating an improved mean magnitude ($\overline{A}_{opt}(f_i,t)$) from the mean magnitude ($\overline{A}(f_i,t)$), magnitudes (A($f_i$,$t_m$)) overshooting the mean magnitude ($\overline{A}(f_i,t)$) by a prescribed difference value are eliminated from the data record (A(t)) to determine the quantiles, and the prescribed difference value is a threefold multiple of the mean deviation (s).

13. A device for detecting a pulse-type mechanical effect on a system part, the device comprising:
  at least one sensor disposed at the system part for continuously detecting and measuring an operating noise present in the system part and outputting measurement signals (M);
  an A/D converter connected downstream of said sensor for digitizing the measurement signals (M) output by said sensor; and
  an arithmetic unit for receiving digitized measurement signals from said A/D converter, said arithmetic unit including:
  a) means for determining a magnitude (A($f_i$,$t_j$)) of a transform of the measurement signals (M) with prescribed parameters ($f_i$) of a mathematical transformation rule in time windows ($\Delta t$) being temporally sequential in time steps ($\delta t$);
  b) means for determining a deviation of the magnitude (A($f_i$,$t_j$)) from a mean magnitude ($\overline{A}(f_i,t)$) for each time step ($\delta t$) and each of the prescribed parameters ($f_i$);
  c) means for deriving an evaluation function (K(t)) for each time step ($\delta t$) from the deviations determined for each of the prescribed parameters ($f_i$);
  d) means for comparing the evaluation function (K(t)) with a threshold value ($K_0$), and using an overshooting of the threshold value ($K_0$) as an index for a presence of a pulse-type signal component indicating the mechanical effect; and
  e) means for determining the mean magnitude ($\overline{A}(f_i,t_j)$) in a sliding fashion as a function of time t from a data record (A(t)) having M magnitudes A($t_m$) with the aid of a relationship:

$$\overline{A}(f_i,t) = (Q_\alpha(f_i,t) + Q_{1-\alpha}(f_i,t))/2$$

with $Q_\alpha$ and $Q_{1-\alpha}$ being respective $\alpha$ and $(1-\alpha)$ quantiles of the magnitudes A($f_i$,$t_m$) respectively determined in a time segment (T), with $t_m = t + m\delta t$, and with m being a whole number.

* * * * *